(12) United States Patent
McGarey

(10) Patent No.: US 12,744,443 B2
(45) Date of Patent: Sep. 22, 2026

(54) CONDUCTIVE LIQUID PUMPING SYSTEM

(71) Applicant: Blue Origin Manufacturing, LLC, Huntsville, AL (US)

(72) Inventor: Patrick Michael McGarey, South Pasadena, CA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/982,781

(22) Filed: Dec. 16, 2024

(65) Prior Publication Data

US 2026/0171881 A1 Jun. 18, 2026

(51) Int. Cl.
*H02K 44/04* (2006.01)

(52) U.S. Cl.
CPC .................................... *H02K 44/04* (2013.01)

(58) Field of Classification Search
CPC ........ H02K 44/02; H02K 44/04; H02K 44/06; F04B 17/03; F04B 15/04
See application file for complete search history.

(56) References Cited

U.S. PATENT DOCUMENTS

| | | | | |
|---|---|---|---|---|
| 5,209,646 | A * | 5/1993 | Smither | H02K 44/04 310/11 |
| 6,658,861 | B1 * | 12/2003 | Ghoshal | H10N 10/00 257/E23.098 |
| 7,316,800 | B1 * | 1/2008 | Dardik | F27D 3/14 266/237 |
| 10,756,611 | B2 * | 8/2020 | Takahashi | B22D 35/00 |

FOREIGN PATENT DOCUMENTS

SU 1371379 A1 * 5/1992

OTHER PUBLICATIONS

Vikas Teotia, Sanjay Malhotra, Kumud Singh and Umakant Mahapatra, “Analysis and Design of Electromagnetic Pump,” Excerpt from the Proceedings of the COMSOL Conference 2010 India.
J. Flesch et al., “Liquid metals for solar power systems,” IOP Conf. Ser.: Mater. Sci. Eng. 228 (2017).
Madhuchhanda Bhattacharya, Tanmay Basak, “A review on the susceptor assisted microwave processing of materials,” Energy, vol. 97, Feb. 15, 2016, pp. 306-338.
Robert K. Smither “Liquid gallium metal cooling for optical elements with high heat loads” Nuclear Instruments and Methods in Physics Research Section A: Accelerators, Spectrometers, Detectors and Associated Equipment, V.266, 1988, pp. 517-524.
Tsutomu Ando et al., “Induction Pump for High-Temperature Molten Metals Using Rotating Twisted Magnetic Field: Molten Gallium Experiment,” IEEE Transactions on Magnetics, vol. 40, No. 4, Jul. 2004, pp. 1846-1857.

* cited by examiner

*Primary Examiner* — Loren C Edwards
(74) *Attorney, Agent, or Firm* — Summit Patents, PC

(57) ABSTRACT

Systems and methods for transporting or pumping a conductive liquid, such as a molten metal, are presented. The system may include a rifled tube that includes a helical structure on its inside surface and an electric coil that can generate a magnetic field inside the rifled tube. The magnetic field may induce a circumferential force on the conductive liquid inside the rifled tube. The helical structure may redirect a circumferential flow of the conductive liquid resulting from the circumferential force to an axially-directed flow in the rifled tube. In this way, conductive liquid may be pumped by a magnetic field without the use of an applied electric current in the conductive liquid.

20 Claims, 3 Drawing Sheets

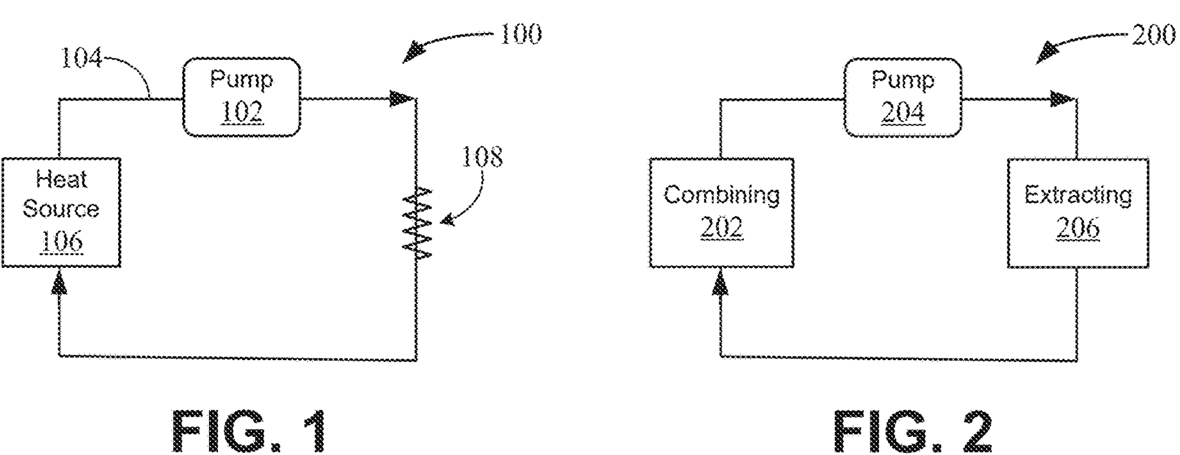
FIG. 1
FIG. 2
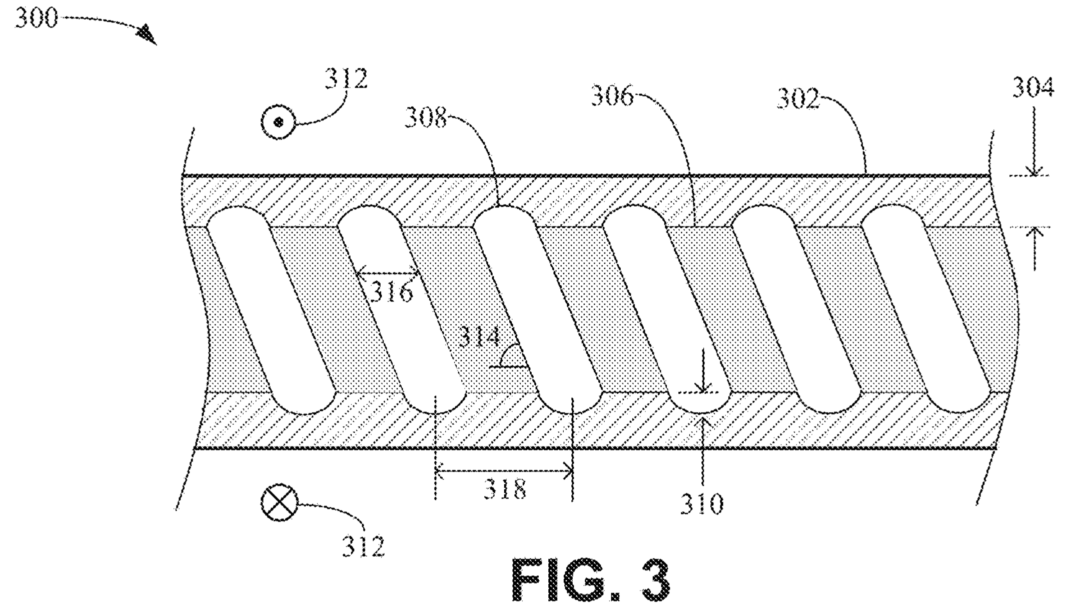
FIG. 3
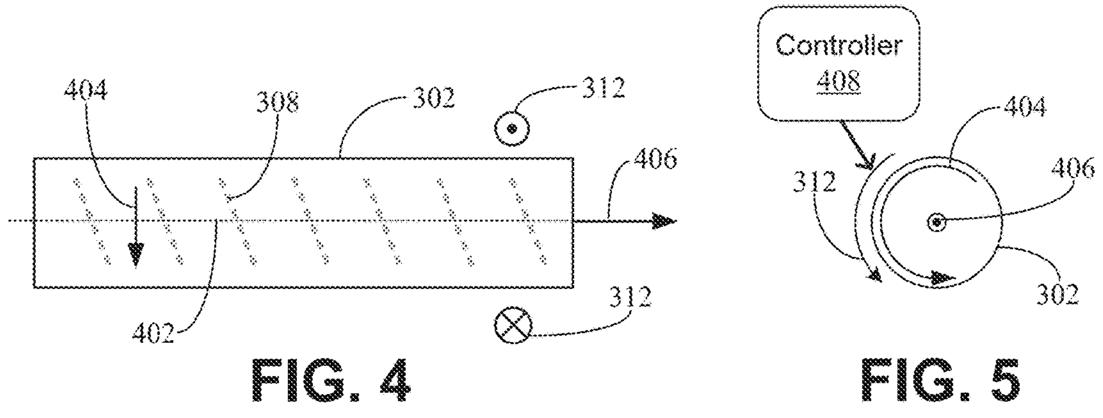
FIG. 4
FIG. 5

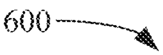
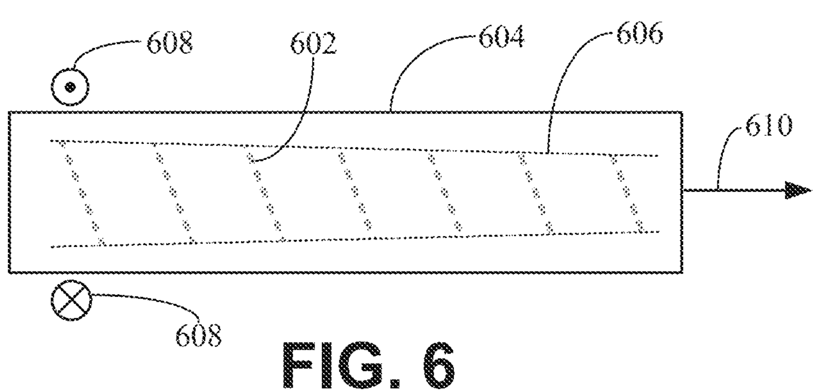
FIG. 6
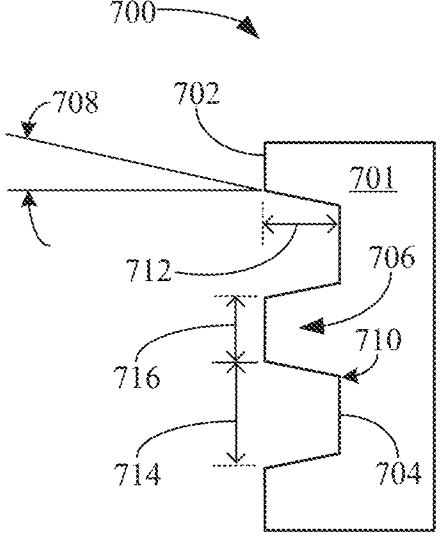
FIG. 7
800
802
806
814
804
812
808
810
801
FIG. 8

CONDUCTIVE LIQUID PUMPING SYSTEM

BACKGROUND

The pumping of molten metal may present a formidable challenge in the development of systems that involve its processing or utilization, particularly for applications in extreme environments such as the Moon's surface. Traditional pumping systems are often used on fluids like water or oil, which are not readily viable in the lunar environment due to the vacuum and the absence of liquid water. As a result, liquid metal pumps emerge as a highly promising solution, offering a system that need not involve moving parts and minimizing the risk of mechanical failure in such harsh conditions. These pumps, historically used in nuclear reactors, generally operate by applying an electric current and magnetic field to a conductive metal.

The potential applications of liquid metal pumps may extend beyond material transport, as they could also contribute to heat management and energy transfer systems for maintaining the functionality of equipment in extreme lunar temperatures. As technology evolves to meet the demands of space exploration, the development of reliable, energy-efficient, and adaptable liquid metal movement systems will likely be a key component in the broader effort to establish sustainable human presence on the Moon and beyond.

SUMMARY

Systems and methods for transporting or pumping a conductive liquid, such as a molten metal, are presented. The system may include a rifled tube that includes a helical structure on its inside surface and an electric coil that can generate a magnetic field inside the rifled tube. The magnetic field may induce a circumferential force on the conductive liquid inside the rifled tube. The helical structure may redirect a circumferential flow of the conductive liquid resulting from the circumferential force to an axially-directed flow in the rifled tube. In this way, conductive liquid may be pumped by a magnetic field without the use of an electric current that is applied to the conductive liquid.

A method, which may use the system described above, may include placing a conductive liquid in the rifled tube, applying a magnetic field to the conductive liquid to induce a circumferential force on the conductive liquid, and using the helical structure of the rifled tube to redirect the circumferential flow of the conductive liquid to an axially-directed flow in the rifled tube. The magnetic field may be produced by alternating electrical currents flowing in a multi-phase coil, which may be a 3-phase coil. The multi-phase coil may be positioned coaxially with the rifled tube, which may be tapered in some implementations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 is a schematic diagram of a closed loop heat exchange system that includes a rifled magnetic field pump, according to some embodiments.

FIG. 2 is a schematic flow diagram of a system for transporting material in a liquid state by using a rifled magnetic field pump, according to some embodiments.

FIG. 3 is a schematic cross-section view of a rifled magnetic field pump, according to some embodiments.

FIG. 4 is a schematic side view of a rifled magnetic field pump illustrating an example orientation of a helical structure, according to some embodiments.

FIG. 5 is a schematic axial view of a rifled magnetic field pump illustrating example flow vectors, according to some embodiments.

FIG. 6 is a schematic side view of a tapered rifled magnetic field pump illustrating an example orientation of a helical structure, according to some other embodiments.

FIG. 7 is a cross-sectional view of an example helical structure, according to some embodiments.

FIG. 8 is a cross-sectional view of an example helical structure, according to some embodiments.

DETAILED DESCRIPTION

Figure 9:
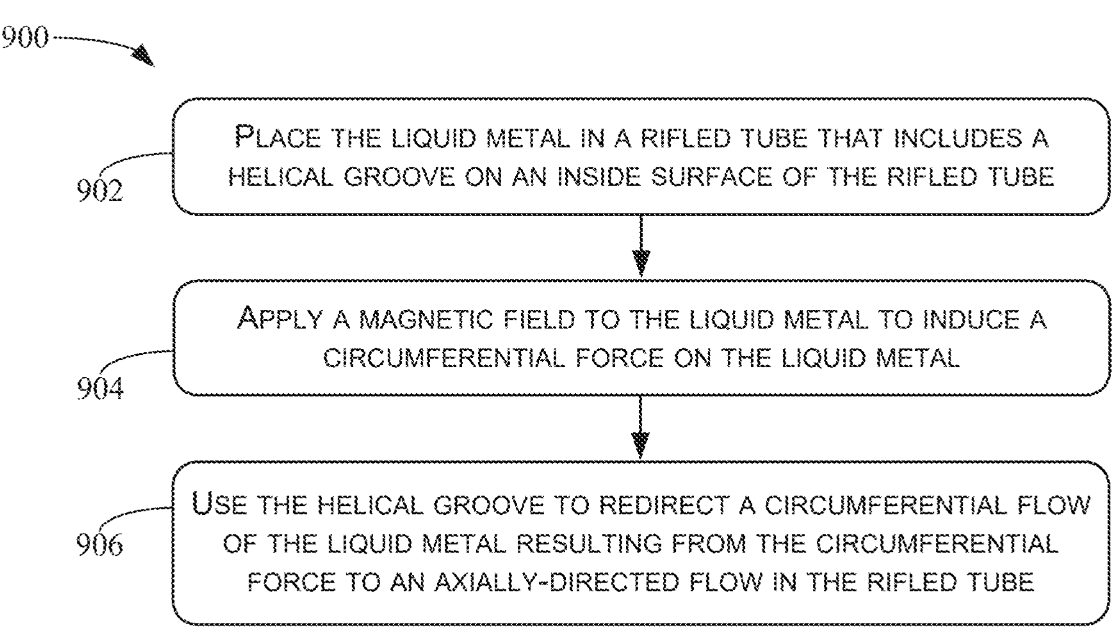
FIG. 9 is a flow diagram of a process for transporting a conductive liquid, according to some embodiments.

This disclosure describes, among other things, systems and methods for transporting or pumping a conductive liquid, such as a molten metal. For example, the system may include a rifled tube that includes a helical structure on its inside surface and an electric coil that can generate a magnetic field inside the rifled tube. The magnetic field may induce a circumferential force on the conductive liquid inside the rifled tube. The helical structure may redirect a circumferential flow of the liquid metal resulting from the circumferential force to an axially-directed flow in the rifled tube. In this way, conductive liquid may be pumped by a magnetic field without the use of an applied electric current in the conductive liquid.

In some implementations that involve lunar regolith processing, liquid metal pumps may be instrumental in facilitating the extraction and processing of key materials, such as silicon and metals, by transporting molten metals like tin or gallium. These materials may be particularly useful due to their ability to dissolve other elements (e.g., molten tin dissolves silicon, molten gallium dissolves aluminum). Moreover, the lunar vacuum offers a unique advantage, as the absence of atmospheric pressure may eliminate the need for hermetic sealing, which is a common challenge on Earth. The deployment of liquid metal pump systems in this manner may allow for efficient in-situ resource utilization (ISRU), reducing dependence on Earth-based supply chains and advancing the feasibility of long-term lunar missions.

Generally, a magnetic field (B-field) can move an electrically conductive fluid by a process of magnetohydrodynamics (MHD), which describes the behavior of electrically conducting fluids in the presence of magnetic and electric fields. The fluid may be an electrically conductive medium, such as a plasma, liquid metal (e.g., molten tin, gallium, mercury, etc.), or a saline solution. In such fluids, there are free charges (electrons or ions) that can move within the fluid. When a magnetic field is applied to a moving conducting fluid, or when the fluid itself moves through the magnetic field, free charges within the fluid experience a Lorentz force, which acts perpendicular to both the fluid's velocity and the magnetic field, causing the fluid to experience a force that can change its motion. If the fluid moves through the magnetic field, it can induce electric currents within the fluid due to electromagnetic induction. The induced currents interact with the magnetic field to produce additional forces that can further influence the fluid's motion.

In some applications, magnetohydrodynamic pumps use the principles described above to move fluids. For example, by applying a magnetic field across a conducting fluid and passing an electric current through the fluid (e.g., perpendicular to the magnetic field), the resulting Lorentz force may cause the fluid to flow in a specific direction. Note that in embodiments described herein and described below, such an electric current is not needed to move the fluid in the desired direction (e.g., axially along a pipe, tube, or channel) and instead a helical feature is utilized, as explained below.

In a particular example, the fluid may be a molten metal such as gallium, which is in a liquid state between about 30 to 2,200 degrees Celsius. If gallium (in its liquid state) is in a non-rifled tube (e.g., smooth inner tube wall) with a coil wrapped around the tube to generate a magnetic field, several effects can occur, depending on how the magnetic field is applied and whether there is also an electric current or motion involved. If the coil generates a static magnetic field and there is no motion of the gallium or electric current applied, nothing significant will happen to the gallium. A magnetic field alone does not directly move the fluid unless other forces come into play. If, however, the magnetic field is time-varying (alternating or changing over time), the field can induce electric currents in the gallium. This occurs because a changing magnetic field creates a time-varying magnetic flux that, due to Faraday's Law of Induction, induces eddy currents (circular electric currents) within the conducting fluid. If an electric current is also applied through the gallium (perpendicular to the magnetic field generated by the coil), a Lorentz force on the moving charges in the gallium may be created. The force can drive the fluid in the direction perpendicular to both the magnetic field and the electric current. This effect is the basis for magnetohydrodynamic pumping, which uses the interaction between the electric and magnetic fields to control the flow of a liquid conductor, such as gallium. Thus, if the magnetic field varies with time or if the gallium itself moves in a static magnetic field, the interaction between the induced eddy currents and the magnetic field can create forces that lead to fluid motion or vortices within the gallium. This is due to the generation of localized forces in the fluid caused by the interaction between the magnetic field and the induced currents.

If the coil around the tube is carrying three-phase alternating current (AC), the magnetic field produced will be a rotating magnetic field that rotates about the axis of the tube. This rotating magnetic field may move in a circular pattern along the inner wall of the tube. This occurs because the currents in the three separate coils (e.g., coil windings) are out of phase with one another by 120 degrees, resulting in a magnetic field that changes direction continuously in a circular manner. Accordingly, the rotating magnetic field induces eddy currents in the liquid gallium. In view of Faraday's Law, the changing magnetic field induces electric currents in the conducting liquid gallium. Since the magnetic field is rotating, it continuously changes direction with respect to any point in the gallium, leading to the generation of circulating currents (eddy currents) in the gallium. The induced eddy currents can interact with the rotating magnetic field, creating a Lorentz force. This force acts on the moving charges (in the eddy currents) in the gallium, exerting a torque or causing the liquid gallium to move. The result is a rotational motion of the gallium, driven by the forces generated through the interaction of the magnetic field and the induced currents. This rotational motion is described herein as a circumferential current because the motion follows (on the inside surface) the circumference of the tube (e.g., in its diametric cross-section) about the central axis of the tube. The flow induced by the rotating magnetic field in this configuration will be primarily circumferential, meaning the gallium (or other liquid conductor) will flow around the circumference of the tube. In other words, the resulting flow is a circumferential rotation of the gallium within the tube. The gallium essentially moves in a circular path around the tube's central axis, creating a rotational flow pattern.

Thus far, in the example above, in a non-rifled tube and no applied electric current, flow is only circumferential. But now consider a rifled tube, which includes a helical relief or structure (such as grooves or ridges) on the inside surface of the tube. The rifling may result in the circumferential flow being at least partially redirected to an axial flow along the tube, creating a helical or axial flow (vector) component. In detail, the helical relief introduces a physical disturbance to the otherwise smooth inner wall of the tube. As the gallium (e.g., or other conductive fluid) flows circumferentially, it encounters the helical grooves or ridges of the rifling. The shape of the helical relief will likely at least partially guide the gallium flow. As the gallium moves over the helical relief, it will experience local forces that redirect part of its flow along the axis of the tube. As the gallium follows the path of least resistance along the helical grooves, it will spiral down the tube, combining the original circumferential flow with a new axial flow component. The result is a helical flow pattern, where the fluid moves both around the circumference and along the length of the tube simultaneously. This effect can be used for MHD pumping, where the combination of the magnetic field and the helical relief (without involvement of an applied voltage or electric current in the fluid) helps drive the fluid in a desired direction along the tube.

The extent to which the flow is redirected may likely depend on the pitch and depth of the helical relief. A steeper pitch (closer to the tube axis) may generate a stronger axial flow component, while a shallower pitch may primarily guide the fluid circumferentially with a minor axial component.

In some embodiments, a method for transporting an electrically conductive liquid may include placing the conductive liquid in a rifled tube, applying a magnetic field to the conductive liquid to induce a circumferential force on the conductive liquid, and using the helical groove of the rifled tube to redirect a circumferential flow of the conductive liquid resulting from the circumferential force to an axially-directed flow in the rifled tube. The magnetic field may be produced by alternating electrical currents flowing in a multi-phase coil, which may be a 3-phase coil. The multi-phase coil may be positioned coaxially with the rifled tube, which may be tapered in some implementations.

In some embodiments, a method for pumping an electrically conductive liquid (ECL) may include placing the ECL in a magnetically transparent tube that includes a helical groove on an inside surface of the magnetically transparent tube, applying a circumferential force on the ECL with a magnetic field to generate a circumferential flow, and redirecting the circumferential flow to an axially-directed flow by using the helical groove as a fluid guide. The magnetic field may be produced by alternating electrical currents flowing in a multi-phase coil, which may be a 3-phase coil and may be positioned coaxially with the magnetically transparent tube. The ECL may be gallium. The magnetically transparent tube may be tapered.

In some embodiments, a system for transporting an electrically conductive liquid may include a rifled tube that is configured to carry the conductive liquid, a multi-phase AC coil wrapped around the rifled tube, and a controller to apply the two or more electric currents. The multi-phase AC coil, which may be stationary with respect to the rifled tube, may be configured to carry two or more electric currents. The multi-phase AC coil may be a 3-phase AC coil. The rifled tube, which may be tapered, includes a helical channel on its inside surface. In some implementations, the system may be a closed loop heat exchanger.

FIG. 1 is a schematic diagram of a closed loop heat exchange system 100 that includes a rifled magnetic field pump 102 configured to pump or transport an electrically conductive liquid, according to some embodiments. For example, system 100 may operate on gallium (or other electrically conductive liquid) in its liquid state that can flow through system 100 via a channel or tube 104 to transfer heat from a heat source 106 to a thermal radiator 108.

Liquid metal pumping and cooling or heat exchange systems may leverage the unique thermal and electrical properties of metals in liquid form to transfer and dissipate heat in various applications. Liquid metals, such as gallium, sodium, potassium, or eutectic alloys (a mix of metals that solidify at a lower temperature than individual components), may generally be very good heat conductors for enabling efficient thermal exchange. These properties may be particularly useful in high-temperature environments, such as nuclear reactors, where liquid metal pumps, such as 102, can circulate a heat exchange liquid without its direct contact with moving mechanical pump parts.

A thermal exchange system, such as 100, may also be useful on the Moon or in other locations beyond Earth's environment. For example, pump 102 uses magnetic fields to induce flow, eliminating the use of traditional moving parts that generally may increase mechanical complexity and reduce reliability. Also, such non-contact pumping provided by pump 102 may be particularly beneficial in environments where maintenance is challenging, such as in space or vacuum conditions on the Moon. The potential for using liquid metal pumps, such as rifled magnetic field pump 102, in lunar or other extraterrestrial environments offers additional benefits due to their adaptability to the vacuum and other conditions that may pose challenges for traditional cooling systems relying on water or air. For example, system 100 may be well-suited for lunar applications due to the Moon's environmental conditions. Traditional cooling and pumping methods on Earth generally rely on air or water for heat transfer, both of which are scarce and behave differently on the Moon. In the vacuum environment of the lunar surface, water-based systems are impractical, as water would quickly evaporate without an atmosphere. Liquid metals, however, operate effectively in a vacuum (e.g., having relatively high vapor pressures), making them an ideal solution for cooling and heat exchange in lunar operations, such as material processing and power generation.

In some embodiments, the lunar environment, with its natural vacuum, may allow for the operation of open-loop heat exchange systems, where liquid metals can be directly exposed without requiring hermetic sealing, simplifying the design and improving durability. For example, gallium has a relatively high vapor pressure and thus will evaporate into vacuum at a slow rate.

FIG. 2 is a schematic flow diagram of a system 200 for transporting material in a liquid state by using a rifled magnetic field pump, according to some embodiments. For example, system 200 may be used to perform a metallurgical process wherein certain metals in their liquid state dissolve another element, such as silicon. The process may later allow the other element (e.g., silicon) to crystallize out of solution in a purified form under controlled conditions. In a particular example, system 200 may incorporate molten tin or gallium to facilitate the extraction of materials like silicon. At a combining block 202, a silicon oxide or silicon-based compound may be mixed into molten tin or gallium. The silicon oxide or silicon-based compound may at least partially dissolve into the liquid metal due to their mutual affinity at relatively high temperatures. This forms a solution of silicon within the liquid metal. For example, either gallium or tin can act as solvents and thus can hold silicon atoms in solution as long as the metal remains molten. Combining block 202 may be configured to ensure that the silicon oxide or silicon-based compound is fully dissolved or finely dispersed in the molten metal so that the mixture maintains a relatively high electrical conductivity.

A rifled magnetic field pump 204 may be used to transport the molten metal-silicon solution to an extracting block 206, which may be configured to slowly cool the molten metal-silicon solution. The cooling process may result in silicon atoms crystallizing out from the liquid phase. This crystallization occurs because, at lower temperatures, silicon is less soluble in the molten metal, so it precipitates out, ideally in a purer crystalline form. The crystallized silicon that separates from the molten metal may have a higher purity than the original silicon source. After crystallization, the solid silicon may be collected, and the remaining metal can be either reused or further processed. This method of extracting or purifying elements like silicon may be particularly useful in environments where traditional extraction or purification methods (such as chemical processing) are not feasible, such as in a vacuum or high-radiation environment like the lunar surface.

FIG. 3 is a schematic cross-section view of a portion of a rifled magnetic field pump 300, according to some embodiments. Illustrated features are not necessarily drawn to scale. For example, pump 300 may be the same as or similar to pump 102 or 204. Pump 300 may include a rifled tube 302 having a wall thickness 304, an inner surface 306, and a helical structure 308. In some implementations, helical structure 308 may comprise a helical channel of a depth 310 in wall thickness 304. In other implementations, helical structure 308 may comprise a helical protrusion (not illustrated) on top of inner surface 306. Tube 302 may be configured to be substantially transparent to magnetic fields and to carry a molten metal or other conductive liquid. For example, if the molten metal is gallium, the material of tube 302 cannot be aluminum because a destructive reaction would occur between the two elements. Instead, tube 302 may be a ceramic or polymer (that can withstand relatively high temperatures of molten metal), just to name a few examples. Claimed subject matter is not limited to any particular tube material or shape.

Pump 300 may also include a coil 312 configured to carry an electric current, such as a multi-phase AC (alternating current) coil. In the figures, vector symbolism includes a point "." to indicate a vector pointing out of the page, and an "X" to indicate a vector pointing into the page. The illustrated current vector direction is only an example. In some implementations, coil 312 may be wrapped around (either on or spaced apart from) rifled tube 302. Coil 312 may be stationary with respect to rifled tube 302 and may be configured to carry two or more electric currents. For example, coil 312 may comprise two or more coiled conductors (wires). In a particular example, coil 312 may be a 3-phase AC coil that includes three coiled wired.

Rifling, as explained above, refers to spiral or helical grooves or ridges (protrusions) in or on inner surface 306 that are cut, impressed, or molded into the interior surface of tube 302, which may be cylindrical. Rifling in a cylindrical structure such as tube 302, generally incorporates features like depth 310 (e.g., or protrusion height), pitch 314 (the angle or steepness of the spiral), width 316, and twist rate, which is the rate at which the spiral completes a full turn 318 along the length of the tube. Each of these features may be designed to influence the characteristics of fluid flow. For example, the combination of a magnetic field and a helical structure helps drive the fluid in a desired direction along rifled tube 302. The extent to which the flow is redirected may likely depend on pitch 314 and depth 310 of the helical structure. A steeper pitch (closer to the tube axis) may generate a stronger axial flow component, while a shallower pitch may primarily guide the fluid circumferentially with a minor axial component. Other features, as described below, may also influence flow and redirection.

Depth 310 (or protrusion height) of the spiral grooves may affect how much the fluid interacts with the spiral grooves. Deeper grooves increase surface area contact and thus have a greater effect on fluid flow, which could enhance desired forward flow in tube 302 or detrimentally create greater turbulence within the fluid. Pitch 314, or the angle of the helical grooves, generally determines how quickly the fluid spins as it moves along the cylinder. A steeper pitch may lead to increased turbulence. For fluids with particles or suspended solids (e.g., silicon or silicon oxide), controlling pitch may help reduce settling by keeping the suspension in motion. A tighter twist rate creates a more rapid rotation of the fluid, while a looser twist results in gentler motion. Twist rate may be selected to manage the intensity of the fluid's rotational flow, balancing between laminar (smooth) and turbulent (more chaotic) flow. Claimed subject matter is not limited to any particular values of these characteristics.

FIG. 4 is a schematic side view of a portion of rifled magnetic field pump 300 illustrating an example orientation of a helical structure 308, and FIG. 5 is a schematic axial view of the rifled magnetic field pump illustrating example flow vectors, according to particular embodiments wherein coil 312 is carrying a 3-phase alternating current. Accordingly, the magnetic field produced by coil 312 may be a rotating magnetic field that rotates around the axis 402 of rifled tube 302. This rotating magnetic field may move in a circular pattern along inner wall 306 of the tube. This occurs because the currents in the three separate coils (e.g., coil windings) are out of phase with one another by 120 degrees, resulting in a magnetic field that changes direction continuously in a circular manner. Thus, the rotating magnetic field induces eddy currents in a conductive liquid (e.g., gallium) that is inside tube 302. Because the magnetic field is rotating, it continuously changes direction with respect to any point in the conductive liquid, leading to the generation of circumferential currents 404 that follow (on the inside surface) the circumference of the tube. The flow induced by the rotating magnetic field in this configuration will be primarily circumferential, meaning the conductive liquid may flow around axis 402 and along the circumference of the tube. In other words, the flow resulting from the magnetic field is a circumferential rotation of the conductive liquid within the tube and about axis 402. In other words, the conductive liquid essentially moves in a circular path 404 around the tube's central axis 402, creating a rotational flow pattern.

But because rifled tube 302 has helical structure 308, circumferential flow 404 may be redirected to a net axial flow 406 along the tube, creating a helical or axial flow (vector) component. As explained above, the helical structure introduces a physical disturbance to the otherwise smooth inner wall 306 of rifled tube 302. As the conductive fluid flows circumferentially, it encounters the helical structure of the rifling. The shape of the helical structure will likely at least partially guide the fluid flow. As the conductive fluid moves over the helical structure, it will experience local forces that redirect part of its flow along axis 402 of the tube. As the conductive fluid follows the path of least resistance along the helical grooves, it may spiral down the tube, combining the original circumferential flow 404 with a new axial flow component 406. The result is a helical flow pattern, where the fluid moves both around the circumference and along the length of the tube simultaneously. This effect drives the fluid in a desired direction along the tube.

The extent to which the flow is redirected may likely depend on the pitch and depth of the helical relief. A steeper pitch (closer to the tube axis) may generate a stronger axial flow component, while a shallower pitch may primarily guide the fluid circumferentially with a minor axial component.

In various embodiments, a controller 408 may be configured to apply electric currents, such as 3-phase electric currents, to coil 312 so as to control the magnetic field that is applied to pump 300. In some implementations, the magnitude and/or frequency of the current(s) that generates the magnetic field may be gradually ramped up to allow circumferential flow 404 to increase gradually and be smoothly redirected down the tube in a controlled manner. Such ramping up may facilitate a gradual increase in the circumferential flow and smooth redirection along the helical structure, leading to stable and controlled helical flow down rifled tube 302. For example, by gradually increasing the magnitude and/or frequency of the current(s), the magnetic field strength rises smoothly, which avoids sudden forces on the conductive liquid. This helps prevent abrupt fluid motion that could cause turbulence or instability. The gradual ramp-up allows the circumferential flow to develop steadily, giving the conductive liquid time to align with the helical structure and begin flowing along the grooves.

As the circumferential flow increases, the interaction with the helical structure may progressively guide the fluid down the tube (e.g., in a direction of 406). A slow ramp-up helps ensure that the transition from purely circumferential flow 404 to a combined helical flow is relatively smooth and stable. This gradual process reduces the likelihood of flow separation or chaotic motion, making it easier to achieve a consistent helical flow pattern. The gradual ramp-up administered by controller 408 may allow time for the conductive fluid to "find" the grooves in the helical structure and adjust to the changing flow direction. The conductive fluid will be more likely to align with the grooves and follow the helical path as the magnetic field strength continues to increase.

FIG. 6 is a schematic side view of a portion of a tapered rifled magnetic field pump 600 illustrating an example orientation of a helical structure 602, according to some other embodiments. For example, pump 600 may be the same as or similar to pump 102 or 204. In some embodiments, pump 600 may include a rifled tube that is tapered (not illustrated) so as to have an outer diameter that decreases along the tube's length. This tapered tube may have a constant wall thickness and an inner surface that includes a helical structure. In other embodiments, as illustrated, pump 600 may include a rifled tube 604 that is tapered on an inner surface 606 upon which is located helical structure 602. As in the case for pump 300, in some implementations, helical structure 602 may comprise a helical channel that penetrates inner surface 606 and into the wall of rifled tube 604. In other implementations, helical structure 602 may comprise a helical protrusion on top of inner surface 606. Tube 604 may be configured to be substantially transparent to magnetic fields and to carry a molten metal or other conductive liquid.

Pump 600 may also include a coil 608 configured to carry an electric current, such as a multi-phase AC (alternating current) coil. In some implementations, coil 608 may be wrapped around (either on or spaced apart from) rifled tube 604. Coil 608 may be stationary with respect to rifled tube 604 and may be configured to carry two or more electric currents. For example, coil 608 may comprise two or more coiled conductors (wires). In a particular example, coil 608 may be a 3-phase AC coil.

Either the outside or inside surface 606 of tube 604 may be tapered to enhance the axial flow speed and helical flow pattern while introducing a beneficial pressure gradient that drives the conductive liquid down the tube, in a direction 610. This may likely make the flow substantially stable and directional, enhancing the efficiency and control of the system. For example, the tube may be tapered so as to influence the flow of the conductive liquid in combination with helical structure 602 and the rotating magnetic field. As the tube narrows, the cross-sectional area decreases, which can increase the axial flow velocity of the conductive liquid due to the conservation of mass in the fluid. This effect is similar to how fluid speeds up in a narrowing pipe (continuity equation), so the conductive liquid may flow faster as it moves toward the narrower end of the tube. The taper introduces a pressure gradient along the length of the tube, with higher pressure at the wider end and lower pressure at the narrower end. This gradient may help drive the conductive liquid in the axial direction (e.g., 610), reinforcing the helical flow pattern.

Also, as the tube narrows, the circumferential flow may experience more resistance from the helical grooves, which could amplify the axial component (e.g., 610) of the flow. This can enhance the helical motion, creating a tighter spiral as the conductive liquid moves down the tapered section. The combination of the taper and helical feature can help ensure that the conductive liquid flows down the length of the tube more efficiently, rather than primarily rotating in place.

FIG. 7 is a cross-sectional view of a portion of an example helical structure 700 of a rifled tube 701, according to some embodiments. For example, helical structure 700 may be the same as or similar to 308. The various dimensions illustrated are not necessarily to scale and claimed subject matter is not limited in this respect. The shapes and dimensions described may generally affect fluid flow and how the helical structure redirects a circumferential flow to an axial flow down tube 701. For example, the combination of a magnetic field and a helical structure helps drive the fluid in a desired direction along rifled tube 701. The extent to which the flow is redirected may likely depend on the pitch and depth of the helical structure. A steeper pitch (closer to the tube axis) may generate a stronger axial flow component, while a shallower pitch may primarily guide the fluid circumferentially with a minor axial component. Other features, as described below, may also influence flow and redirection.

Helical structure 700 may include, on inside surface 702, groove 704 and raised portions 706. The cross-sectional shape of groove 704 may be flat (as illustrated) on the bottom of the groove with side walls that are angled (as illustrated) or perpendicular to the bottom. For example, the side walls may have an angle 708 with respect to horizontal. The bottom of groove 704 may have rounded or sharp-angled corners 710. Groove 704 may have a depth 712 and an entrance width 714. The width 716 of raised portions 706 is the separation of one spiral "wrap" of groove 704 to the next around inside surface 702.

FIG. 8 is a cross-sectional view of an example helical structure 800 of a rifled tube 801, according to some embodiments. For example, helical structure 800 may be the same as or similar to 308. The various dimensions illustrated are not necessarily to scale and claimed subject matter is not limited in this respect. The shapes and dimensions described may generally affect fluid flow and how the helical structure redirects a circumferential flow to an axial flow down tube 801.

Helical structure 800 may include, on inside surface 802, groove 804 and raised portions 806. The cross-sectional shape of groove 804 may be flat (as illustrated) on the bottom of the groove and may transition to side walls with a rounded corner 808. This is in contrast to the relatively sharp-angled corners 710 described above. Avoiding sharp corners may result in improved laminar fluid flow of a conductive liquid in a magnetic field.

Groove 804 may have a depth 810 and a entrance width 812. The width 814 of raised portions 806 is the separation of one spiral wrap of groove 804 to the next around inside surface 802.

Figure 10:
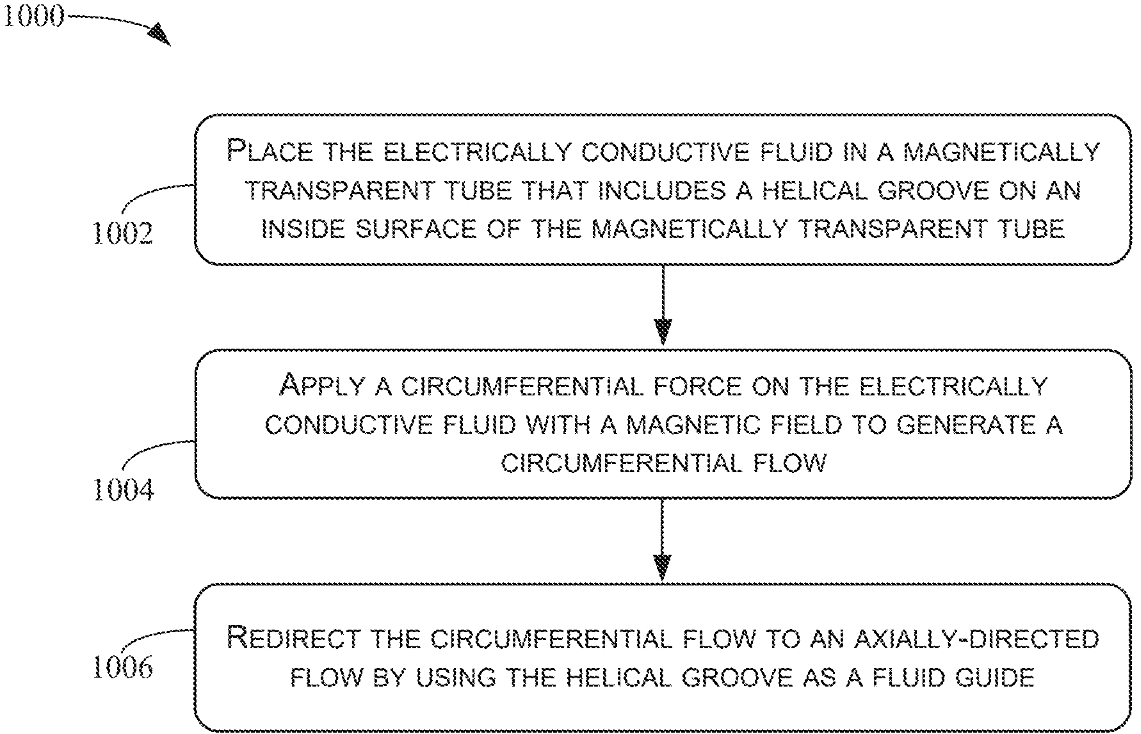
FIG. 10 is a flow diagram of a process for pumping an electrically conductive liquid, according to some embodiments.

FIG. 9 is a flow diagram of a process 900 for transporting a liquid metal, according to some embodiments. The process may be performed by an operator, which may be a person or persons, a computer processor executing computer-readable code, or a combination thereof. At 902, the operator may place the liquid metal, such as gallium, in a rifled tube that includes a helical structure on an inside surface of the rifled tube. At 904, the operator may apply a magnetic field to the liquid metal to induce a circumferential force on the liquid metal. At 906, the operator may use the helical structure to redirect a circumferential flow of the liquid metal resulting from the circumferential force to an axially-directed flow in the rifled tube FIG. 10 is a flow diagram of a process 1000 for pumping an electrically conductive fluid, according to some embodiments. The process may be performed by an operator, which may be a person or persons, a computer processor executing computer-readable code, or a combination thereof. At 1002, the operator may place the electrically conductive fluid in a magnetically transparent tube that includes a helical structure on an inside surface of the magnetically transparent tube. At 1004, the operator may apply a circumferential force on the electrically conductive fluid with a magnetic field to generate a circumferential flow. At 1006, the operator may redirect the circumferential flow to an axially-directed flow by using the helical structure as a fluid guide.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim:

1. A method for transporting an electrically conductive liquid, the method comprising:

placing the conductive liquid in a rifled tube having a cylindrical interior and including a helical groove or helical protrusion integral with an inside surface of the rifled tube;

applying a magnetic field to the conductive liquid to induce a circumferential force on the conductive liquid so as to generate a circumferential flow of the conductive liquid within the cylindrical interior and about an axis of the rifled tube, the circumferential flow being redirected by the helical groove or protrusion to produce an axially-directed flow; and using the helical groove or helical protrusion formed in the inside surface of the rifled tube and bounding the cylindrical interior to redirect the circumferential flow of the conductive liquid to the axially-directed flow in the rifled tube.

2. The method of claim 1, wherein the magnetic field is produced by alternating electrical currents flowing in a multi-phase coil.

3. The method of claim 2, further comprising ramping up a frequency of the alternating electrical currents during a starting phase of applying the magnetic field.

4. The method of claim 2, wherein the multi-phase coil is a 3-phase coil.

5. The method of claim 2, wherein the multi-phase coil is positioned coaxially with the rifled tube.

6. The method of claim 1, wherein the conductive liquid is gallium.

7. The method of claim 1, wherein the rifled tube comprises a ceramic.

8. The method of claim 1, wherein the rifled tube is tapered.

9. A method for pumping an electrically conductive liquid (ECL), the method comprising:

placing the ECL in a magnetically transparent tube having a cylindrical interior and including a helical groove or helical protrusion integral with an inside surface of the magnetically transparent tube;

applying a circumferential force on the ECL with a magnetic field to generate a circumferential flow of the ECL within the cylindrical interior and about an axis of the magnetically transparent tube, the circumferential flow being redirected by the helical groove or helical protrusion to produce an axially-directed flow within the cylindrical interior; and redirecting the circumferential flow to the axially-directed flow by using the helical groove or helical protrusion formed in the inside surface of the magnetically transparent tube and bounding the cylindrical interior.

10. The method of claim 9, wherein the magnetic field is produced by alternating electrical currents flowing in a multi-phase coil.

11. The method of claim 10, wherein the multi-phase coil is a 3-phase coil.

12. The method of claim 10, wherein the multi-phase coil is positioned coaxially with the magnetically transparent tube.

13. The method of claim 9, wherein the ECL is gallium.

14. The method of claim 9, wherein the magnetically transparent tube is tapered.

15. A system for transporting an electrically conductive liquid, the system comprising:

a rifled tube that is configured to carry the conductive liquid, wherein the rifled tube has a cylindrical interior and includes a helical groove or helical protrusion integral with an inside surface of the rifled tube;

a multi-phase AC coil wrapped around the rifled tube and configured to carry two or more electric currents; and a controller to apply the two or more electric currents to the multi-phase AC coil so as to generate a magnetic field that induces a circumferential flow of the conductive liquid within the cylindrical interior and about an axis of the rifled tube, the circumferential flow being redirected by the helical groove or helical protrusion to produce an axially-directed flow within the cylindrical interior.

16. The system of claim 15, wherein the multi-phase AC coil is a 3-phase AC coil.

17. The system of claim 15, wherein the helical groove has a rounded bottom and rounded sidewall transitions configured to promote laminar flow.

18. The system of claim 15, wherein the rifled tube is tapered.

19. The system of claim 15, wherein the system is a closed loop heat exchanger.

20. The system of claim 15, wherein the multi-phase AC coil is stationary with respect to the rifled tube.

* * * * *